Dec. 23, 1952  P. STEINACKER ET AL  2,622,796
COUNTERCURRENT EXTRACTION CENTRIFUGE
Filed Feb. 24, 1950  2 SHEETS—SHEET 1
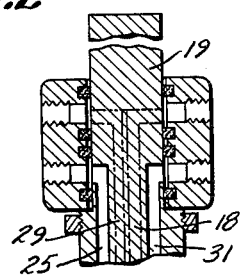
Fig.2
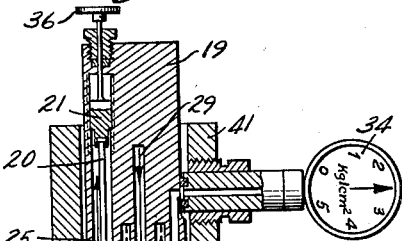
Fig.1
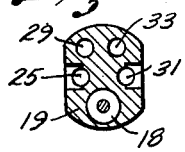
Fig.3
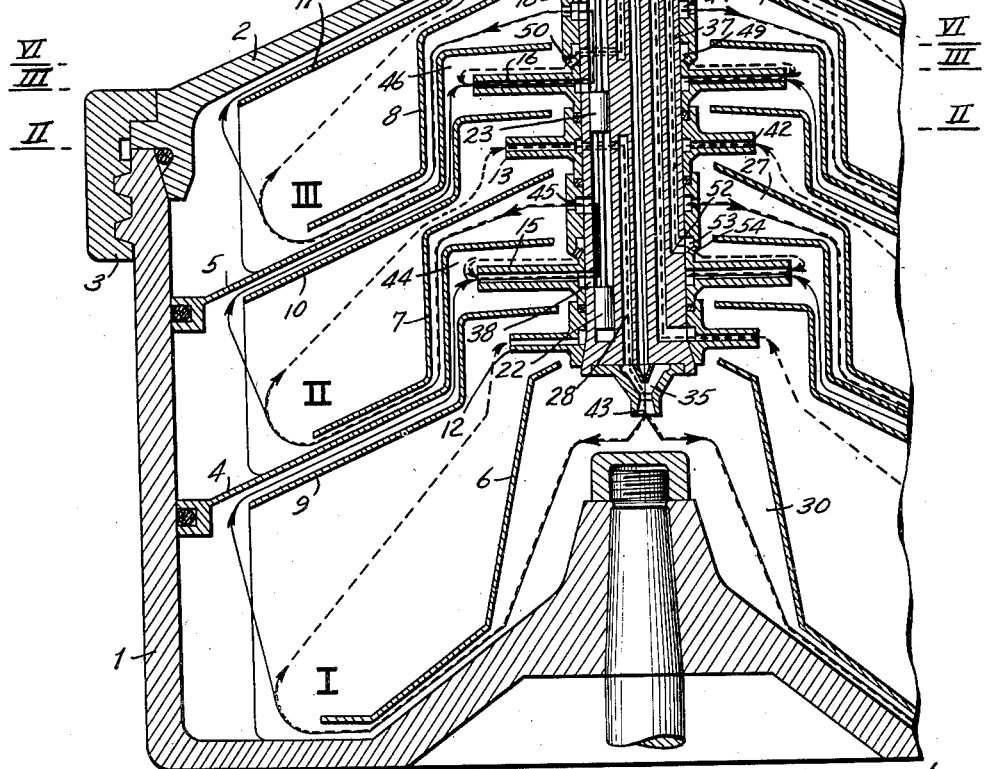
Inventors
PETER STEINACKER
& HEINRICH HEMFORT
By Burgess + Dinklage
Attorneys

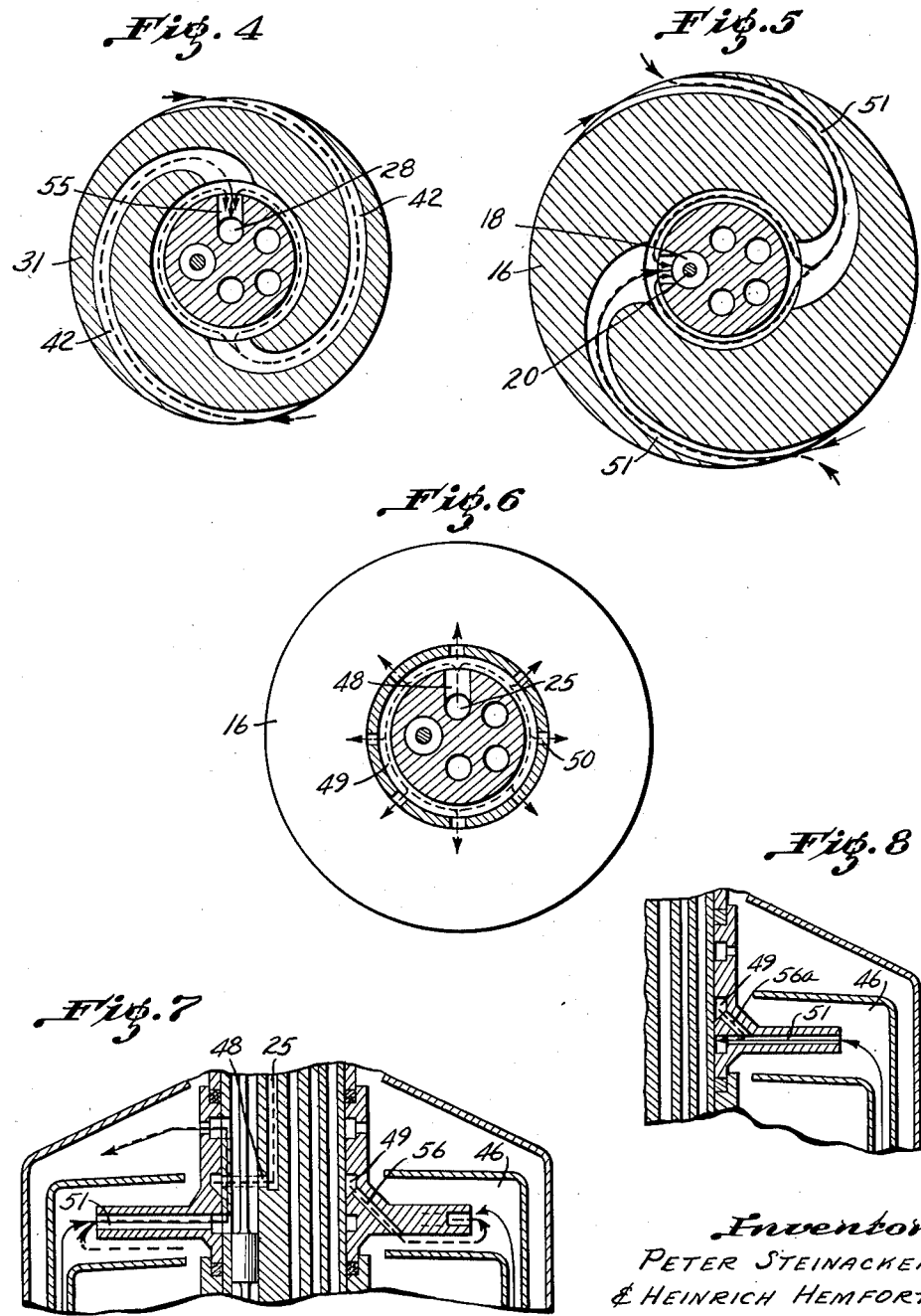

Patented Dec. 23, 1952

2,622,796

UNITED STATES PATENT OFFICE 2,622,796

COUNTERCURRENT EXTRACTION CENTRIFUGE

Peter Steinacker and Heinrich Hemfort, Oelde, Westphalia, Germany, assignors to Westfalia Separator A G., Oelde, Westphalia, Germany, a German corporation Application February 24, 1950, Serial No. 146,005
In Germany March 1, 1949

16 Claims. (Cl. 233—15)

This invention relates to new and useful improvements in countercurrent extraction centrifuges.

The solvent extraction of liquids usually involves the intimate mixing of two liquids and preferably in countercurrent fashion to thereby extract a material preferentially soluble in one of the solvents. This solvent extraction of materials carried in one liquid by means of another liquid in which the material is preferentially soluble requires for efficient operations that the extracting solvent is relatively little soluble in the liquid to be extracted and that both liquids are capable to form separate relatively distinct layers. For this reason, the two liquids should be characterized by a differential in their specific gravities.

Thus, for instance, when it is desired to extract phenol from an aqueous phenol solution, a butyl acetate may be used as the extracting solvent being relatively little soluble in aqueous media. The material to be extracted, i. e., the phenol, though soluble in water, is more soluble in the extracting solvent, i. e., the butyl acetate. In general the more pronounced the preferential solubility, the more rapid and efficient will be the extraction and the less solvent will be usually required. A well-known application of solvent extraction is that of multiple-stage extraction. Each of the multiple stages normally involves both a mixing and separation step. The multiple stages are usually so arranged in sequence that considered in their entirety the extraction agent and the raw material, i. e., liquid containing the material to be extracted flow in countercurrent fashion. Fresh solvent thus enters that stage at which the extracted liquid exits. The solvent thus flowing countercurrent to the liquid to be extracted will become increasingly charged from stage to stage with the material to be extracted.

It has also been proposed to arrange in alternating sequence several separation centrifuges and mixing pumps. A further improvement of this arrangement has the multiple stage extraction centrifuge in which each stage constitutes as such a centrifuge in which the liquids which have been mixed prior or during their passage into the stage are again separated and individually removed from this centrifugal stage.

Inasmuch as this type of countercurrent extraction usually involves the mixing of liquids at least one of which comprises a relatively volatile solvent, it is important to avoid as much as possible losses of liquid such as by vaporization during the centrifugal treatment of these liquids.

It is furthermore necessary in many cases to prevent oxidation or other deterioration of the materials treated such as by their contact or mixing with air. Still further, many of the liquids when volatilized during extraction or centrifugal separation will form vapors constituting health hazards. One device for overcoming these difficulties and to achieve multiple stage countercurrent centrifugal extraction is the stripping disc which dips into the rotating liquid. The stationary stripping disc removes the liquid in a manner which by reason of its subsurface contact with the liquid substantially avoids undue contact with or occlusion of air and undue vaporization and still further prevents foaming. The arrangement of such stripping discs, however, for multiple-stage centrifuges is relatively difficult and involves a relatively cumbersome, complicated, and expensive construction.

One object of the invention comprises among others a relatively simple construction of a multiple stage countercurrent centrifuge provided with multiple stripping discs.

Another object of the invention is the simple and intimate mixing or remixing of liquids prior to or while being introduced into the centrifugal stages.

A still further object of the invention is a construction permitting a single set of stripping discs to be usable over a wide range of different liquids of widely varying specific gravities.

The foregoing and still further objects of the invention will be apparent from the following description read in conjunction with the drawings in which Fig. 1 illustrates a cross section of a centrifuge construction in accordance with the invention;

Fig. 2 is a cross section through part of the top portion of the construction shown in Fig. 1 at right angles thereto and in the plane II—II thereof;

Fig. 3 is a horizontal section through the upper portion of the stripping disc shaft of the construction of Fig. 1 in the plane III—III thereof;

Fig. 4 is a cross-sectional view through the stripping disc 13 of Fig. 1 for the specifically lighter liquid in the intermediate stage;

Fig. 5 represents a cross-sectional view of the stripping disc 16 of Fig. 1 for the specifically heavier liquid in the intermediate stage;

Fig. 6 illustrates a horizontal cross section through the stripping disc shaft just above the stripping disc 16 of Fig 1 in the Plane VI—VI thereof;

Fig. 7 represents a cross-sectional view of a portion of a centrifuge construction in accordance with the invention and showing an alternative feed arrangement for the specifically lighter liquid; and Fig. 8 illustrates an alternative construction of a portion of the construction shown in Fig. 7.

In accordance with the invention, multiple stripping discs are arranged above each other on a stationary common shaft extending through the various centrifugal stages, the shaft being provided with ducts arranged substantially side by side and communicating with the stripping disc passages in a manner and arrangement adapted to pass stripped liquid from stage to stage and out of the centrifuge.

The simple and intimate mixing or re-mixing of the liquids is accomplished by the passage of the specifically lighter liquid into the stripping chamber for the specifically heavier liquid. The ducts communicating with the stripping discs for the specifically lighter liquid lead within this preferred embodiment of the invention into the stripping discs for the specifically heavier liquid.

Within the further preferred embodiment of the invention permitting the use of a single set of stripping discs independent of variations in the specific gravities of the liquids treated in the centrifugal device, suitable valving means are provided within at least some of the ducts within the stripping shaft. The liquid levels of specifically differing liquids will assume in a centrifuge stripping chamber different positions of balance relative their distance from the axis of centrifugal rotation. The higher the difference between the specific gravities of two liquids, the higher will be the difference between the radial distances of the liquid levels of these two liquids from this axis. For this reason, therefore, a given pair of stripping discs can be normally used only for two liquids of a specific predetermined differential in specific weights. Though it is possible in simple constructions of stripping disc chamber centrifuges to vary the immersion depth of one or both stripping discs, by varying flow resistance in the stripping channels, its application to multiple stage centrifuges is encumbered with difficulties and expensive construction that do not make this expedient feasible in the manner and arrangement hitherto used. This is particularly true since a multiple stage centrifuge requires for efficient operation that the liquid flow restriction be substantially synchronized for the various stages. This is accomplished in accordance with the invention by providing common valving means for corresponding stripping discs or their channels or their ducts. These valving means being variable and preferably manually adjustable permit to shift the liquid levels uniformly in all stages by increasing or decreasing the flow restriction controlled by the valving means until the radial distances of the respective liquid levels corresponding to their specific gravity differentials will have assumed positions at which all of the stripping discs strip and feed the respective liquids in their correct proportion.

A preferred construction in accordance with the invention showing a common valving means is a multiple piston slide arranged within a longitudinal bore of the stationary stripping disc shaft. This construction is particularly advantageous when extending the end of the multiple piston slide through the top of the stripping disc shaft to be accessible from the outside and adjustable by a suitable wheel, lever or the like.

Referring to the drawings, Fig. 1 represents a centrifuge drum comprising three stages or separating chambers I, II, and III. The centrifuge drum comprises basket 1, cover 2, and closure ring 3, all of which are mounted for rotation in the conventional manner. Partitions 4 and 5 divide the inner drum space into three separate chambers. Each of these separating chambers operates as an independent separate centrifuge or centrifugal stage. Separating chamber I carries the distributor insert 6 and the separator insert or plate 9. Distributor insert 7 and separator plate 10 are provided in separating chamber II. The separating chamber III has the distributor insert 8 and the separator plate 11. Stationary shaft 19, secured to the centrifuge frame (not shown) carries three stripping discs 12, 13, and 14 for removal of the specifically lighter liquid and three further stripping discs 15, 16, and 17 for the removal of the specifically heavier liquid.

There are further provided in shaft 19 for the feeding or removal of liquids the side-by-side positioned longitudinal channels or ducts 18, 25, 28, 29, 31, and 37. Longitudinal channel 18 is of larger cross-sectional diameter than the other longitudinal channels or ducts of shaft 19 and serves at the same time as a guide channel for the valving means in the form of a multiple piston slide valve having the pistons 22, 23, and 24 arranged one above the other on the common piston rod 20. The upper end of piston rod 20 is provided with threaded spindle 21 and the hand wheel 36. Turning of the hand wheel will shift the pistons 22, 23, and 24 thereby increasing or decreasing as the case may be the exit ports 38, 39, and 40 which communicate with the stripping channels of the stripping discs 15, 16, and 17 and the longitudinal channel or duct 18. As soon as the ports are partly closed by the pistons, the immersion depth of the stripping discs will be increased which in turn results in an increase in the feed pressure of the stripping discs. Feed pressure is thus a direct measure for the immersion depth of the stripping discs and of the relative position of the liquid levels within the centrifuge drum. For the purpose of checking and controlling this pressure and thereby controlling the correct and efficient operation of the centrifuge, there is provided by way of further embodiment of the invention a pressure gauge in communication with a stripping disc channel and preferably the stripping channel of the uppermost stripping disc.

In the illustrated construction, longitudinal channel or duct 18 is simultaneously used as the connecting channel or passage between the stripping disc of one centrifugal stage and the inflow into the next centrifugal stage. The upper portion of the longitudinal channel or duct 18 still further serves as the exit channel or passage of the specifically heavier liquid stripped by the stripping disc 17 to be removed from the centrifuge. The three pistons serve at the same time to separate the feed channels from the stripping discs 15, 16, and 17 from each other. Space 32 near piston 24 is connected to pressure gauge 34 by way of the channel or duct 33, the gauge being secured by way of the connecting member 41.

The following example illustrates the operation of the centrifuge in accordance with the invention in connection with the extraction of an aqueous phenol solution:

*Example*

The path of travel of the aqueous phenol solution as the specifically heavier liquid in this case is illustrated by the solid lines while the path of travel of the extraction solvent, butyl acetate, being the specifically lighter liquid, is shown by the broken lines. Flow directions are indicated by arrows.

When a centrifuge is in operation the bowl 1 is caused to rotate by suitable motor means, which causes any liquid therein to rotate and be separated into its lighter and heavier components by the centrifugal action, the phenolic water flows through channel 29 and is mixed in the injector 35 with butyl acetate passed to the same from the second centrifugal stage by way of the stripping channels 42, stripping disc 13, and the longitudinal channels 28. The resulting mixture enters the distributing chamber 39 by way of the aperture 43 and passes thence into the separating chamber I in which the mixture is separated. The water from which by now part of the phenol has been extracted flows between the partition 4 and the separating plate 9 into the stripping chamber 44 into which butyl acetate is passed from the third centrifugal stage.

Stripping disc 15 mixes the liquids and feeds the mixture through the channel portion 18 which is located above piston 22, the mixture passing through ports 45 into the distributing chamber 27. The mixture is thence passed into the separating chamber II in which it is again separated. The water which has now lost a still further portion of its phenol passes between partition 5 and separating plate 10 into the stripping chamber 46 into which fresh butyl acetate is passed by way of the longitudinal channel 25. Channel 25 is connected to an external source of butyl acetate (not shown).

Stripping disc 16 mixes the liquids and feeds the mixture through channel portion 18 positioned above piston 23 into the distributing chamber 26 by way of the ports 47. The mixture passes thence into separating chamber III in which it is once more separated. The dephenolated water passes between centrifuge cover 2 and separating plate 11, being removed and passed out of the centrifuge by way of the stripping disc 17 and channel or duct 18.

The flow sequence of the butyl acetate is as follows:

The fresh butyl acetate is passed into annular space 49 by way of the longitudinal channel 25 and cross channel 48. The butyl acetate passes by way of ports 50 onto the upper side of the stripping disc 16 in stripping chamber 46 in which it will position itself on top of the specifically heavier liquid, i. e., the aqueous medium. The banked liquid level above stripping disc 16 is in balance with the liquid level below stripping disc 16 to bring both the butyl acetate and the aqueous medium simultaneously into effective stripping contact with the opening of the stripping channel of stripping disc 16. In this manner, the liquids are intimately mixed by way of the stripping channels 51 of stripping discs 16 thereby obtaining for both liquids an extraction balance. The butyl acetate will extract phenol from the water which has at that point been previously extracted two times. The mixture is then passed by way of stripping discs 16, stripping channels 51, longitudinal channel portion 18 above piston 23, and by way of ports 47 into distributing chamber 26 and thus into the third centrifugal stage in which it is again separated. The butyl acetate is thence forced into the annular space 53 by way of the stripping disc 14, longitudinal channel 37, and cross channel 52. The butyl acetate is thence passed by way of ports 54 onto the upper side of the stripping disc 15 in stripping chamber 44 in which it is again superimposed upon the water level and there again being mixed with the water in the manner above described. The resulting mixture is then passed into the distributing chamber 27 by way of the stripping disc 15, the portion of longitudinal channel 18 above piston 22 and by way of the ports 45, being thus passed into the second centrifugal stage in which it is separated once again. The butyl acetate is then passed to the injector 35 by way of the stripping disc 13, cross channel 55, and longitudinal channel 28. In injector 35, the butyl acetate is mixed with untreated phenolic water. The mixture passes thence into the distributing chamber 39 and thus to the first centrifugal stage in which it is again separated. The phenol-enriched butyl acetate passes then to the stripping disc 12 whence it is passed out of the centrifuge by way of the channel or duct 31.

The ports for passing the specifically lighter liquid into the stripping chamber need not be situated so as to pass the liquid onto the upper side of the stripping discs. It is possible to position these ports on the under side of the stripping discs and, if desired, suitable ducts may pass through the stripping discs with their ports at the under side thereof. In either case, the results are the same, and the specifically lighter and specifically heavier liquids will find their balance which will adjust to have both liquids enter the stripping channels for the intimate mixing thereof in the manner herein described. While the stripping discs herein illustrated and used for mixing purposes are shown to have a lower lip somewhat extending beyond the rim of the upper portion of the disc, such a construction, though offering at times certain advantages is not necessary to the effective operation of the mixing feature of these discs. The discs can be absolutely straight-sided, and the mixing effect will be obtained just the same.

Fig. 7 for instance illustrates and alternative construction for a stripping disc intended for a mixing stage. As there illustrated, the stripping disc has substantially straight edges, i. e., it does not have a projecting under lip. Furthermore, the same carries the channels or ducts 56 from the annular space 49 to the under side of the stripping disc. Also in this case, the specifically lighter liquid will superimpose itself upon the specifically heavier liquid and in time a balance between both liquids will be reached, at which the stripping end of the stripping channel 51 of the stripping disc will effectively take in both liquids intimately mixing the same.

The longitudinal channels in stationary shaft 19 of Fig. 1 have been shown schematically as being substantially situated in a single plane. It is desirable, however, as a practical matter, to arrange these channels such as is illustrated in Figs. 3, 4, 5, and 6, appropriately distributed within the shaft. The positioning of these ducts is preferably such that there is thereby obtained in each case the shortest possible distance of communication between the stripping disc on the one hand and the feed ports on the other.

Specifically referring to Fig. 8, the side duct or channel 56a for the specifically lighter liquid leads from space 49 into the stripping channel 51 to be there mixed with the specifically heavier liquid also passed through the stripping channel 51 in a forced feed fashion.

As will be seen from the foregoing, the invention within the broadest aspects thereof essentially comprises the improvement of a stationary center shaft, means defining in each centrifugal stage at least one chamber for separated specifically heavier liquid and at least one chamber for separated specifically lighter liquid, multiple stripping discs on said shaft, at least one for and extending into each of said chambers, and means defining multiple passages within said shaft, at least one for each stripping disc in communication with its stripping channel and with the inlet to a centrifugal stage other than that of its stripping disc.

We claim:

1. In a multiple stage countercurrent extraction centrifuge, the improvement which comprises a stationary center shaft, means defining in each centrifugal stage at least one chamber for separated specifically heavier liquid and at least one chamber for separated specifically lighter liquid, multiple stripping discs on said shaft, at least one for and extending into each of said chambers, said shaft defining multiple passages therein, at least one for each stripping disc in communication with its stripping channel, and with the inlet to a centrifugal stage other than that of its stripping disc, at least one of the communicating passages from a stripping disc for a specifically lighter liquid being positioned in liquid communication with the path of liquid flow of the specifically heavier liquid to a stripping disc in another centrifugal stage.

2. Improvement according to claim 1 in which the communicating passage for the specifically lighter liquid in liquid communication with the path of liquid flow of the specifically heavier liquid is so positioned that said communicating passage exits into a chamber for separated specifically heavier liquids of a centrifugal stage other than that of the stripping dics for said passage, whereby the specifically heavier liquid and the specifically lighter liquid are mixed by the stripping disc in said chamber for separated specifically heavier liquid.

3. Improvement according to claim 1 in which there are additionally provided valving means common to at least one set of corresponding stripping discs for variably controlling liquid flow through the communicating passages of said discs.

4. Improvement according to claim 1 in which there is additionally provided a pressure gauge mounted externally of the centrifuge and communicating with the stripping channel of at least one stripping disc.

5. Improvement according to claim 4 in which said valving means are piston slide valves and in which said guage is mounted in communication with such stripping channel for pressure measurement at a point beyond the flow controlling sliding range of said valving means.

6. In a multiple stage countercurrent extraction centrifuge the improvement which comprises a stationary center shaft, means defining in each centrifugal stage a receiving chamber for a mixture of liquids, a first stripping chamber for separated specifically heavier liquid and a second stripping chamber for separated specifically lighter liquid, multiple stripping discs on said shaft, at least one for and extending into each of said stripping chambers, means defining, within said shaft, a longitudinal duct, multiple exit ports from said duct, at least one each for and in communication with one said receiving chamber of adjacent centrifugal stages, multiple entrance ports into said duct, at least one each for and in communication with the stripping channel of a stripping disc being one of a first set of first chamber stripping discs and a second set of second chamber stripping discs, multiple inlets at least one into and for each of the stripping chambers of the other said set of stripping discs and multiple additional ducts, at least one for each of adjacent centrifugal stages and in communication with one stripping disc of said other set and with one of said inlets of a centrifugal stage other than that of its stripping disc, a multiple piston slide valve within said first-mentioned duct, with its pistons positioned and dimensioned to divide said first-mentioned duct into separate channels connecting each two adjacent exit and entrance ports therein and for lengthwise slidable movement in said duct over corresponding ports therein for variably adjustable restriction thereof, and means for variably moving said pistons lengthwise of said duct.

7. Improvement according to claim 6 in which said pistons are carried on a common piston rod extending to the top of said shaft and provided at its end with manually operable means for said rod for moving the same lengthwise of said duct.

8. Improvement according to claim 6 in which each said entrance port in said first-mentioned duct of one centrifugal stage is in communication with the stripping channel of the first stripping chamber disc of an adjacent centrifugal stage, in which each said additional duct is in communication with the stripping channel of a second stripping chamber disc of one centrifugal stage and with one said inlet in the second stripping chamber of an adjacent centrifugal stage.

9. In a multiple stage countercurrent extraction centrifuge which comprises a stationary center shaft, means defining at least one first, at least one last and at least one intermediate centrifugal stage, means within each said stages defining a receiving chamber for a mixture of liquids, a first stripping chamber for separated specifically heavier liquid and a second stripping chamber for separated specifically lighter liquid, multiple stripping discs on said shaft, at least one for and extending into each of said stripping chambers, means defining within said shaft, a longitudinal first duct, an exit port from said first duct for and into each receiving chamber of said last and intermediate stages, an entrance port into said first duct for and in communication with the stripping channel of each first stripping chamber disc of all of said stages, a multiple piston slide valve within said first duct, with its pistons positioned and dimensioned to divide said first duct into separate channels connecting the entrance port of one centrifugal stage with the exit port of the next higher centrifugal stage and to provide for the entrance port of the last centrifugal stage a lead-off channel for specifically heavier liquid, said pistons being further positioned and dimensioned for lengthwise slidable movement in said first duct over the entrance ports therein for variably adjustable restriction thereof, means for variably moving said pistons lengthwise of said first duct, means defining a second duct within said shaft for passing fresh specifically heavier liquid to the first stage receiving chamber, means defining a third duct within said shaft for feeding fresh specifically lighter liquid into the passage of specifically heavier liquid to the last stage receiving chamber, means defining further ducts within said shaft for conducting separated specifically lighter liquid from each second stripping chamber disc of one centrifugal stage into the passage of specifically heavier liquid to the next higher centrifugal stage, and means defining within said shaft an exit duct for specifically lighter liquid from the second stripping chamber disc of said first centrifugal stage.

10. Improvement according to claim 9 in which said third duct exits into the first stripping chamber of the stage next to the last centrifugal stage, and in which said further ducts other than to the first stage receiving chamber, each exits into the first stripping chamber of the second next lower stage.

11. Improvement according to claim 10 in which a mixing nozzle is provided in the first stage receiving chamber and in which said second duct and that of said further ducts leading to said first stage receiving chamber terminate in said nozzle.

12. Improvement according to claim 11 in which said pistons are carried on a common piston rod extending to the top of said shaft and provided at its end with manually operable means for said rod for moving the same lengthwise of said duct.

13. Improvement according to claim 9 in which said first-mentioned means define one first, one intermediate, and one last centrifugal stage, in which said third duct exits into the first stripping chamber of said intermediate stage, in which said further ducts comprise a fourth duct leading from the stripping channel of the second stripping chamber disc of said last stage into the first stripping chamber of said first stage and a fifth duct leading from the stripping channel of the second stripping chamber disc of said intermediate stage into the receiving chamber of said first stage co-terminus with said second duct, and in which said piston divided separate channels lead respectively from the stripping channel of the first stripping chamber disc in said first stage to the receiving chamber of said intermediate stage and from the stripping channel of the first stripping chamber disc in said intermediate stage to the receiving chamber in said last stage.

14. Improvement according to claim 13 in which a mixing nozzle is provided at the co-terminus of said second and fifth ducts.

15. Improvement according to claim 14 in which said pistons are carried on a common piston rod extending to the top of said shaft and provided at its end with manually operable means for said rod for moving the same lengthwise of said duct.

16. Improvement according to claim 15 in which an externally readable pressure guage is provided for registry of pressure within said lead-off channel.

PETER STEINACKER.
HEINRICH HEMFORT.

REFERENCES CITED

The following references are of record in the file of this patent:

UNITED STATES PATENTS

| Number | Name | Date |
| --- | --- | --- |
| Re. 21,168 | Coutor | Aug. 1, 1939 |
| 2,176,982 | Thayer | Oct. 24, 1939 |
| 2,189,230 | Sheldon | Feb. 6, 1940 |
| 2,261,724 | Holm | Nov. 4, 1941 |
| 2,344,888 | Lindgren | Mar. 21, 1944 |